United States Patent [19]

Reedy

[11] Patent Number: 5,325,973
[45] Date of Patent: Jul. 5, 1994

[54] BICYCLE SUPPORT RACK
[75] Inventor: Michael H. Reedy, Edwardsville, Ill.
[73] Assignee: Lee Rowan Company, St. Louis, Mo.
[21] Appl. No.: 28,974
[22] Filed: Mar. 10, 1993
[51] Int. Cl.$^5$ .............................................. A47F 5/00
[52] U.S. Cl. .................................. 211/18; 211/90; 211/106
[58] Field of Search .................. 211/18, 17, 104, 106, 211/90

[56] References Cited

U.S. PATENT DOCUMENTS

| D. 313,957 | 1/1991 | Marinelli et al. | |
|---|---|---|---|
| 2,952,366 | 9/1960 | Botten | 211/104 |
| 4,392,572 | 7/1983 | Bernard | |
| 4,700,845 | 10/1987 | Fretter | 211/18 |
| 4,830,196 | 5/1989 | Csanady | |
| 5,054,628 | 10/1991 | Allen | |
| 5,074,419 | 12/1991 | Smith | |
| 5,125,517 | 6/1992 | Martinell | 211/18 |

Primary Examiner—Robert W. Gibson, Jr.
Attorney, Agent, or Firm—Rogers, Howell & Haferkamp

[57] ABSTRACT

The present invention relates to a bicycle support rack that includes a shelf piece and a U-shaped bracket. The shelf piece is anchored to a wall along the rear, and has front corners supporting retaining hooks and apertured fixtures. The U-shaped bracket has a base portion anchored to the wall below the rear of the shelf piece. The arms of the U-shaped bracket extend diagonally up from the base to inwardly bent ends. The inwardly bent ends can be removably disposed through the apertures of the apertured fixtures, thereby resulting in a releasable engagement between the shelf piece and U-shaped bracket. The retaining hooks provide removable support for a bicycle by retaining the top tube of the bicycle frame.

16 Claims, 2 Drawing Sheets

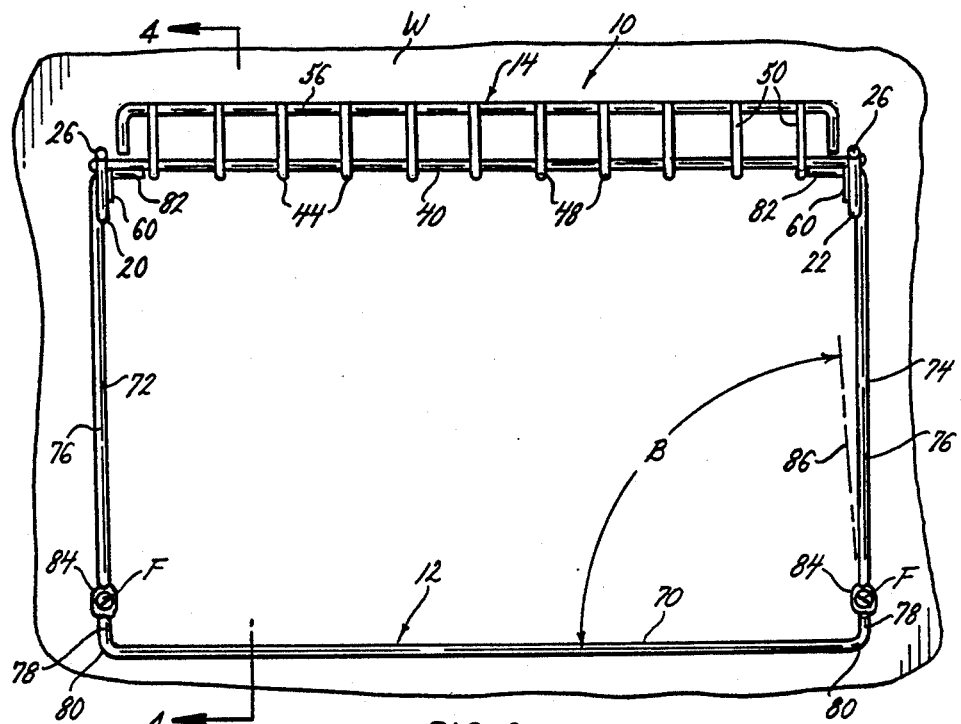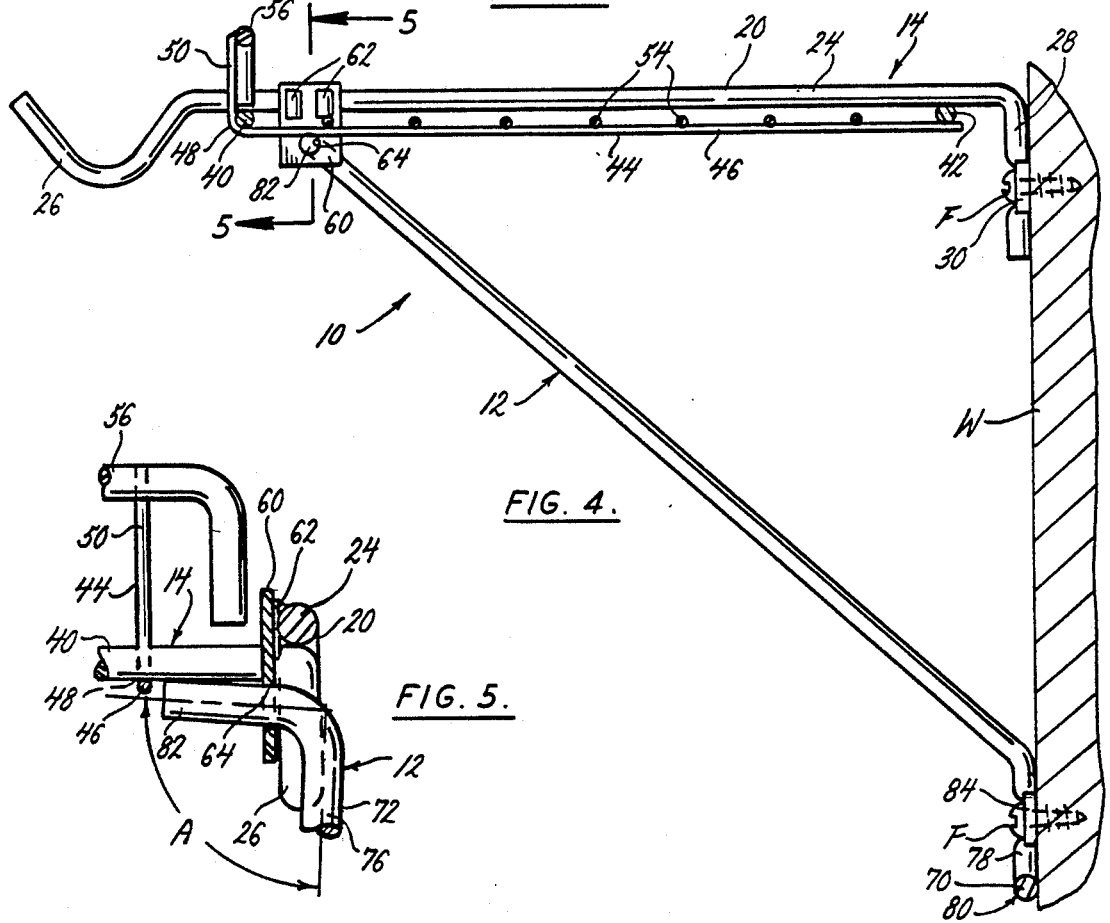

BICYCLE SUPPORT RACK

BACKGROUND OF THE INVENTION

The present invention generally relates to wall mountable support racks, and more particularly to wall mountable support racks for supporting bicycles and cycling accessories.

The storage of bicycles on support racks is advantageous for gaining floor space and decreasing congestion in cramped quarters. Typically, the known support rack is in the form of a heavy mountable base or stand and at least one large support bracket. The heavy base or stand is mounted immovably either to a wall, to a floor, or between a floor and a ceiling. The support bracket is anchored to the base or stand and extends out to forward retainers. The forward retainers support a bicycle by way of retaining the top tube of the bicycle frame in a horizontal position.

The known racks are not satisfactory because of their relatively large size and heavy weight. Overall, they are relatively expensive. Their relatively large size requires that they be packaged in relatively large cartons for shipping, inventory storage, and display on retail store shelves. Compared to smaller cartons, large cartons cost more to ship, store, and display. Their relatively heavy weight only adds to the cost of shipment. They also are deficient in occupying too much of the shelf space which retailers typically allocate for the display of cycling accessories. What is needed is a rack that provides support for bicycles and cycling accessories, that can be packaged in relatively compact cartons, and that is lightweight, inexpensive, and strong.

SUMMARY OF THE INVENTION

In accordance with the present invention, a bicycle support rack includes a shelf and a U-shaped bracket. The shelf is anchored along its rear to a wall. Each front corner of the shelf supports a retaining hook and an apertured fixture. The U-shaped bracket has a base portion anchored to the wall below the rear of the shelf. The arms of the U-shaped bracket extend diagonally up from the base to inwardly bent ends. The inwardly bent ends are removably inserted through the apertures of the apertured fixtures, thereby resulting in a releasable engagement between the shelf and the U-shaped bracket. The retaining hooks provide removable support for a bicycle by way of retaining the top tube of the bicycle frame in horizontal position. Cycling accessories can be removably placed on the shelf.

Both the shelf and the U-shaped bracket are wire components, thereby gaining a reduction in weight for this bicycle support rack. Both the shelf and the U-shaped bracket are generally planar, thereby permitting the present rack to be packaged in disassembled form in a relatively flat and compact carton. The reduced weight and the relatively more compact carton gain reductions in fabrication, distribution, and retail costs. Consequently, this bicycle support rack is inexpensive yet strong.

BRIEF DESCRIPTION OF THE DRAWINGS

Further objects and features of the present invention are revealed in the following detailed description of the preferred embodiment of the invention and in the drawing figures wherein:

FIG. 3 is a front elevation view of the present rack;

FIG. 4 is an enlarged section view taken along the line 4—4 of FIG. 3; and

FIG. 5 is an enlarged partial section view, partly broken away, taken along the line 5—5 of FIG. 4.

DESCRIPTION OF THE PREFERRED EMBODIMENT

Figure 1:
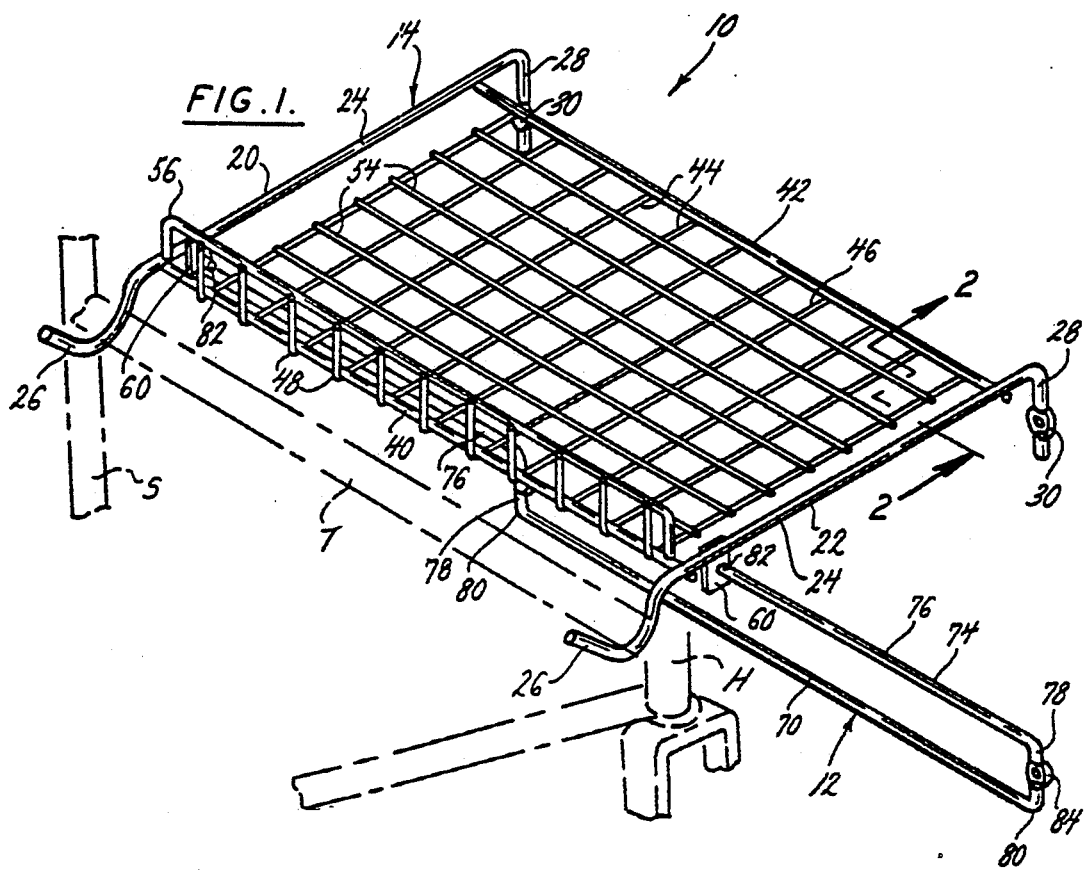
FIG. 1 is a perspective view of the bicycle support rack of the present invention, with a bicycle, shown in broken lines for illustrative purposes and partly broken away, being supported by a pair of hooks of the present rack.

FIGS. 1, 3 and 4 show the bicycle support rack 10 of the present invention as it would appear while mounted on a wall W. The bicycle support rack 10 comprises a U-shaped bracket 12 and a shelf piece 14.

The shelf piece 14 is a fixed frame of wire elements. It includes a pair of laterally (left to right) spaced side elements 20 and 22. Each side element 20 and 22 comprises three segments. As better shown in FIG. 4, a central segment 24 extends horizontally between a V-shaped outer segment 26 in the front and a vertical back segment 28 in the back. The vertical back segment 28 has an apertured portion 30 with an aperture for receiving a wall fastener F. The V-shaped front segment 26 has a rounded crotch. A pair of spaced cross elements 40 and 42 extend between and have upper surfaces welded to opposite lower surfaces of the side elements 20 and 22.

The cross elements 40 and 42 support a plurality of L-shaped wires 44 in the mutually parallel arrangement shown by FIG. 1. As better shown in FIG. 4, each L-shaped wire 44 has a horizontal segment 46 extending between a back end and a central bend 48, and a vertical segment 50 extending up from the central bend 48 to a top end. The central bend 48 has inside surfaces welded to front-lower surfaces of the front cross element 40. The horizontal segment 46 has upper surfaces welded to lower surfaces of the back cross element 42. The horizontal segments 46 support a plurality of shelf wires 54 in the arrangement shown by FIG. 1. The vertical segments 50 cooperatively support an inverted-U shaped element 56 from welded joints near their top ends.

Each side element 20 and 22 supports an apertured fixture 60 from a position on the central segment 24 near the welded engagement with the front cross element 40. The apertured fixtures 60 are pieces of metal plate and have a pair of protrusions 62 extending out from one face. The pair of protrusions 62 are welded to inside surfaces of the adjacent side element 20, 22. Each apertured fixture 60 has a laterally extending aperture 64 placed through such a portion of the fixture 60 that extends lower than the adjacent side element 20, 22.

The U-shaped bracket 12 is a wire element that has a base cross segment 70 and opposite bent segments 72 and 74. Each bent segment 72 and 74 comprises three sections. As better shown in FIGS. 4 and 5, an inclined central section 76 extends between a lower-rear bend and an upper-front bend. A vertical outer section 78 extends between the lower-rear bend and a bent end 80 of the base cross segment 70. And an inwardly projecting outer section 82 extends from the upper-front bend to an outer end of the U-shaped bracket 12. Each rear vertical section 78 has an apertured portion 84 with an aperture for receiving a wall fastener F. As FIG. 5 shows, the inwardly projecting outer section 82 intersects the inclined central section 76 at an angle A of about 95 degrees.

FIG. 3 depicts the U-shaped bracket 12 in a resiliently flexed position. An unflexed position for the U-shaped bracket 12 is shown by a vertical centerline 86, representative of how the bent segment 74 would normally extend in unflexed angular relation to the base cross segment 70. The vertical centerline 86 intersects the base cross segment 70 at an angle B of about 88 degrees. In the flexed position, the bent segments 72 and 74 are resiliently flexed laterally out from the unflexed position 86.

The shelf piece 14 and the U-shaped bracket 12 are releasably engaged together, and generally this involves post and hole engagements. As FIG. 5 shows, the apertures 64 of the apertured fixtures 60 permit the removable insertion of the inwardly projecting outer sections 82 of U-shaped bracket 12. The apertured fixtures 60 are laterally spaced apart by about the same distance as the span between the inside surfaces of the rear vertical sections 78. The inherent resiliency of the U-shaped bracket 12, while flexed away from the unflexed position 86, retains the inwardly projecting outer sections 82 in engagements with the apertured fixtures 60. The 95 degree angle A promotes security against disengagement.

FIG. 1 shows that the V-shaped front segments 26 act as support hooks for a bicycle. The parts of a bicycle which are illustrated include a top tube T extending between a head tube H and a seat tube S. The V-shaped front segments 26 provide removable support for the bicycle by retaining the top tube T in a horizontal position.

Figure 2:
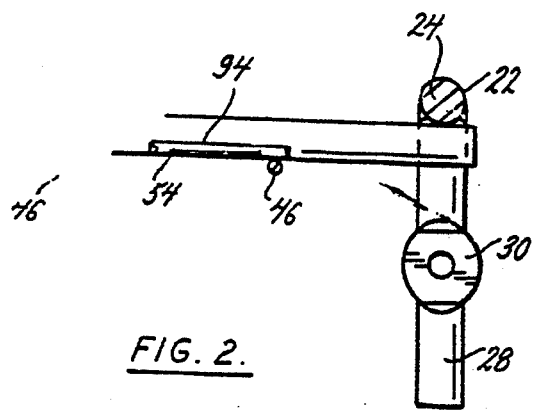
FIG. 2 is an enlarged, offset section view, partly broken away, taken along the line 2—2 of FIG. 1.

FIG. 2 shows that the shelf wires 54 have upper surfaces 94 collectively defining a shelf surface. The side elements 20 and 22 and the rear cross element 42 protrude higher than the shelf surface 94, and thus act as side and rear retaining rails. FIG. 1 shows that the vertical segments 50 and inverted-U shaped element 56 protrude up substantially more so, and thus cooperate as a front retainer for the shelf.

Both the shelf piece 14 and the U-shaped bracket 12 are generally planar. In disassembled form, they can be packaged together in a relatively compact carton, consequently gaining reductions in the costs of shipment and storage, as well as display on retail store shelves.

While the present invention has been described by reference to a specific embodiment, it should be understood that modifications and variations of the invention may be constructed without departing from the scope of the invention defined in the following claims.

What is claimed is:

1. A bicycle support rack comprising:

a resilient element having an unflexed position comprising a U-shape, the resilient element comprising a central base portion mounted on a wall and opposite outer segments which extend from the central base portion to terminate in bent ends;

a planar member having a back end mounted on the wall at an elevation different from the central base portion, and extending from the back end to a forward portion, the forward portion providing a pair of laterally spaced sprockets for removable engaging the bent ends while the outer segments of the resilient element are flexed from the unflexed position, said resiliency retaining the bent ends in engagements with the sockets;

retaining means for supporting a bicycle by a top tube thereof, the retaining means being cooperatively supported by and disposed in a rigid relation with the removably engaged resilient element and planar member and the planar member comprises a pair of laterally spaced wire segments, the wire segments having rear apertured portions for receiving fasteners.

2. The bicycle support rack of claim 1, wherein:

the planar member is oriented horizontally while mounted on the wall and while removably engaged with the resilient element.

3. The bicycle support rack of claim 2, wherein:

the central base portion is mounted on the wall at an elevation below the back end of the planar member.

4. The bicycle support rack of claim 1, wherein:

the retaining means is securely joined to the planar member.

5. The bicycle support rack of claim 2, including:

a frame shelf;

the planar member supports the frame shelf.

6. The bicycle support rack of claim 5 wherein:

the retaining means comprises a laterally spaced pair of V-shaped segments extending in the front to back direction, each V-shaped segment having a rear portion securely joining the planar member.

7. The bicycle support rack of claim 6, wherein:

the planar member includes a pair of laterally spaced wire segments with horizontal portions extending between a forward bend and a rear portion, and the V-shaped segments are wire segments joined to and extending forwardly from the forward bends.

8. The bicycle support rack of claim 1, wherein:

each outer segment lies in a generally vertical plane that is generally perpendicular to the adjacent wall while the planar member and resilient element are mounted on the wall and removably engaged together.

9. The bicycle support rack of claim 8, wherein:

the bent ends intersect the outer segments generally at an angle of about 95 degrees.

10. A bicycle support rack comprising:

a planar member having a back end mounted on a wall and extending forwardly substantially horizontally to a front end of the planar member, the planar member defining a shelf surface between its back end and front end for supporting objects thereon, and the planar member having a front retainer vertically upward from the front end of the planar member for preventing objects supported on the shelf surface from sliding over the front end and off of the shelf surface;

a bracket having a rearward end mounted on the wall and a forward end mounted to the planar member to support the planar member extending substantially horizontally from the wall; and, retaining means extending forwardly from the planar member front end for supporting a bicycle from a top tube thereof.

11. The bicycle support rack of claim 10, wherein:

the planar member has a plurality of substantially horizontally crisscrossing wires forming the shelf surface of the planar member, and some of the plurality of crisscrossing wires have vertical segments that form a part of the front retainer of the planar member.

12. The bicycle support rack of claim 10, wherein:

the planar member has a back cross element that extends across the back end of the planar member and projects vertically above the shelf surface for preventing objects supported on the shelf surface from sliding over the back end and off the shelf surface.

13. The bicycle support rack of claim 10, wherein:
the retaining means comprises a laterally spaced pair of V-shaped segments extending forwardly from the planar member.

14. A bicycle support rack comprising:
a planar member having a back end mounted on a wall and extending forwardly substantially horizontally to a front end of the planar member, the planar member defining a shelf surface between its back end and front end for supporting objects thereon, and the planar member having a laterally spaced pair of side elements extending forwardly from the back end of the planar member to the front end along laterally opposite edges of the planar member shelf surface, the side elements both are spaced vertically above the opposite edges of the shelf surface for preventing objects supported on the shelf surface from sliding over the laterally opposite edges of the planar member and off of the shelf surface;
a bracket having a rearward end mounted on the wall and a forward end mounted to the planar member to support the planar member extending substantially horizontally from the wall;
retaining means comprising a laterally spaced pair of V-shaped segments extending forwardly from the pair of side elements for supporting a bicycle from a top tube thereof; and,
the planar member has a back cross element that extends across the back end of the planar member and projects vertically above the shelf surface for preventing objects supported on the shelf surface from sliding over the back end and off the shelf surface.

15. The bicycle support rack of claim 14, wherein:
the pair of V-shaped segments are integral extensions of the pair of side elements.

16. The bicycle support rack of claim 14, wherein:
the planar member has a plurality of substantially horizontally crisscrossing wires forming the shelf surface of the planar member, and the pair of side elements are spaced vertically above the plurality of crisscrossing wires.

\* \* \* \* \*